Figure 1:
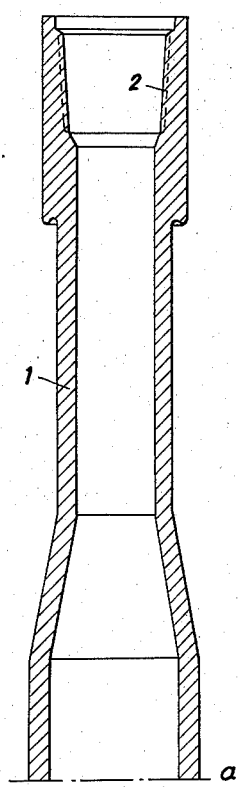

Oct. 13, 1959

H. RIETSCH 2,908,534

BEARING ASSEMBLY FOR THE SHAFT OF UNDERGROUND
HYDRAULIC TURBINES FOR DRIVING DRILL
BITS IN DEEP-WELL DRILLING

Filed April 2, 1957

INVENTOR.
HERWIG RIETSCH
BY
*Albert M. Parker*
ATTORNEY.

United States Patent Office 2,908,534
Patented Oct. 13, 1959

2,908,534

BEARING ASSEMBLY FOR THE SHAFT OF UNDERGROUND HYDRAULIC TURBINES FOR DRIVING DRILL BITS IN DEEP-WELL DRILLING

Herwig Rietsch, Vienna, Austria, assignor to Mannesmann-Trauzl Aktiengesellschaft, Vienna, Austria, a firm Application April 2, 1957, Serial No. 650,161

3 Claims. (Cl. 308—162)

This invention relates to a bearing assembly for the shaft of drilling turbines, which comprise a stationary shell tube which is screwed to the lower end of the drill pipe and contains the guide vane groups of the turbine, as well as the rotary shaft carrying the runners of the turbine and a screw thread for the drill bit at the lower end. The shell tube and the shaft are held in their relative position by a multiple-collar bearing, which must take up considerable forces. The turbine is driven by the drilling mud, which consists mainly of water containing substantial amounts of clay and other additions and circulates to bring the drillings to the surface.

The multiple-collar bearings used in the previously known drilling turbines have water-lubricated slide faces of rubber. The multiple-collar bearings of rubber comprised steel rings and steel discs alternately arranged on the turbine shaft and rotating between stationary, rubber-faced discs in the casing tube of the turbine. The bore of these stationary discs is also faced with rubber, on which the steel rings of the multiple-collar bearing slide to provide at the same time for a radial guidance and support for the shaft.

The useful life of these multiple-collar bearings consisting of rubber is of the greatest importance for the operation of the drilling plant because a substantial wear of the rubber facings will cause the runners of the turbine to approach the stationary guide vanes; a mutual contact thereof will cause the destruction of the turbine. The wear of the rubber facings is even more critical because the clearance between the runners and guide vanes of the turbine should be as small as possible, for high efficiency. The high wear of the turbine bearings constructed at the present time is due to the inadequate lubrication thereof and necessitates the removal of the drilling turbine after a relatively short operating time for replacing the worn discs of the multiple-collar bearing.

In the previously known constructions the drilling mud is fed to the turbines through openings formed in the rubber-faced stationary discs of the multiple-collar bearing. Because the openings for the drilling mud are disposed radially outside the slide face of rubber, the lubricating fluid enters only from the outside. Since centrifugal force opposes the entrance of lubricant between the portions to be lubricated the lubrication is inadequate and cannot prevent a high wear of the slide faces of rubber.

This disadvantage is avoided by the bearing assembly provided according to the invention for drilling turbine shafts and comprising flow passages for the drilling fluid on the inside and outside of annular slide faces of the multiple-collar bearing so that the lubricating drilling fluid can enter between the slide faces from both sides and the centrifugal force will promote the lubrication. According to the invention the rotary and stationary discs of the multiple-collar bearing comprise groove-shaped recesses which are open towards the turbine shaft and towards the shell tube, respectively and provide passages for the drilling fluid. Thus the cross-sections of the flow passages are limited by the shell tube of the turbine and by the turbine shaft, respectively. In order to locate the discs of the multiple-collar bearing relative to each other to form vertical, straight passage ducts extending through the recesses, a section rail is inserted in a vertical row of recesses formed in the superimposed stationary discs of the multiple-collar bearing. Radial guide bearings for the turbine shaft are arranged according to the invention directly before and behind the multiple-collar bearing. Radial gaps are provided in the multiple-collar bearing between the stationary and rotary discs thereof. Thus the lubrication of the multiple-collar bearing is promoted by a good circulation of the drilling mud.

Figure 2:
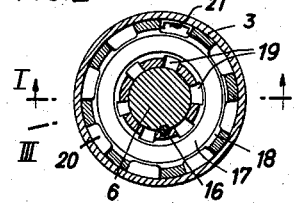
Figure 3:
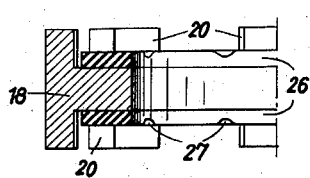
Figure 1A:
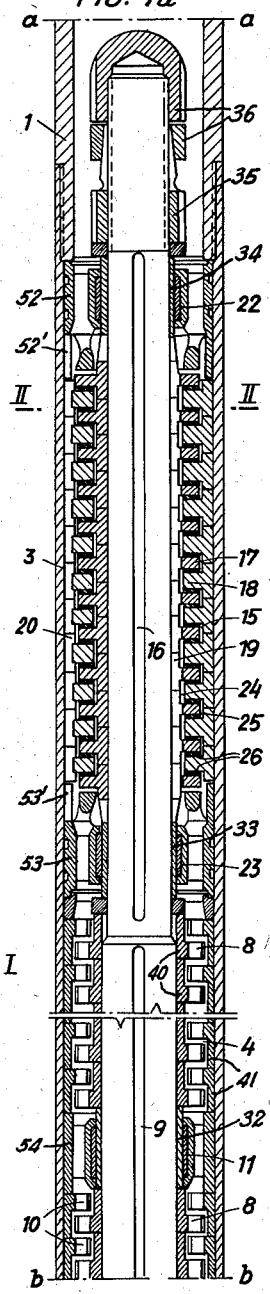
Figure 1B:
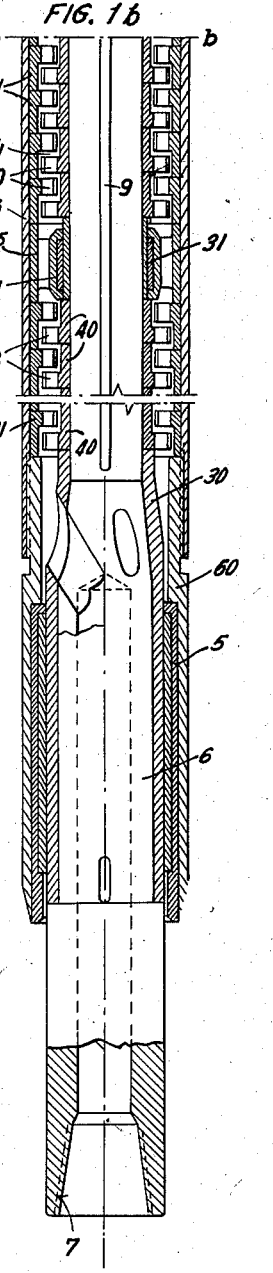

A drilling turbine shaft bearing assembly according to the invention is shown in the drawing. Fig. 1 is a central sectional view showing the upper portion of the drilling unit. Fig. 1A is a similar view taken on line I—I in Fig. 2 and showing the intermediate portion of this unit with the axial thrust bearing and the upper portion of the drive turbine. Fig. 1B is a similar view showing the lower portion of this unit with the lower portion of the drive turbine and the socket for the connection of the drill bit. The intermediate portion is connected to the upper portion in the plane of division a—a and to the lower portion in the plane of the division b—b. Fig. 2 is a sectional view taken on line II—II of Fig. 1A and Fig. 3 is a central sectional view showing a half of a stationary disc of the multiple-collar bearing.

The adapter 1 is connected by the screw threads 2 to the drill pipe section (not shown), which are screwed together and extend above the surface. The casing tube 3 of the turbine 4 is screwed to the lower end of the adapter 1 and is screw-connected in known manner at its lower end to the guide bearing 5, in which the turbine shaft 6 rotates, which is connected by its screw threads 7 to the drilling tool, not shown.

The turbine runners 8 are carried on the turbine shaft 6 and are connected for rotation therewith by the key 9. The guide vane rings 10 of the turbine are built up between the runners 8 and are connected to the casing tube 3. Radial guide bearings 11 are incorporated in the turbine 4.

The considerable axial thrust of the turbine is downwardly directed and is increased in some cases by a rotating drill stem interposed between the turbine and the drilling tool. The very high drilling pressure set up during operation acts upwardly in an axial direction. These axial pressures are taken up by the multiple-collar bearing 15 disposed in the casing 3 before the turbine 4.

The multiple-collar bearing 15 consists of the collars 17 carried on the turbine shaft 6 and fixed thereto by the key 16, and the annular discs 18 carried by the casing 3. The rings 17, the rotor blade rings 40 of the turbine, and the interposed spacing sleeves 30, 31, 32, 33, 34 are clamped on the turbine shaft by means of the nut 35 and the lock nut 36 screwed on the upper end of the turbine shaft. The discs 18 are clamped in a similar manner together with the stator blade rings 41 of the turbine by means of the outer carrying bushings 52, 53, 54, 55 of the radial bearings. The bushings 52, 53 have appropriate extensions 52' and 53' formed with apertures. Clamping is effected by screwing the lower guide part 60 (Fig. 1B) into the lower end of the turbine casing 3. As is shown more particularly in Fig. 2 the collars 17 have groove-shaped recesses 19, which are open towards the shaft 6 and the annular discs 18 have also groove-shaped recesses 20, which are open towards the casing 3. The annular discs 18 are located in their relative position by a section rail 21, which is inserted in a vertical row of grooves. Thus the recesses 19 and 20 form vertical flow passages for the drilling mud and the cross-sections of said passages are limited by the casing 3 and the shaft 6, respectively.

Radial guide bearings 22 and 23 for the turbine shaft 6 are arranged directly before and behind the multiple-collar bearing 15. Thus radial clearances 24 and 25 for the passage of the drilling mud can be provided between the collars 17 and the annular discs 18.

As is shown in Fig. 3 the annular discs 18 have rubber facings 26 vulcanized thereto on both sides, with which the smooth collars 17 are in sliding engagement. The rubber facings 26 have radial grooves 27 for the entrance of liquid, in order to enable the access of the drilling mud, which serves also as lubricant, to the slide faces.

It is distinctly apparent from the drawing that the stream of liquid having passed the guide bearing 22 divides into the passages formed by the recesses 19 and 20 and extending along the shaft 6 and the casing 3, to reunite at the lower guide bearing 23, whereafter it flows to the turbine.

The slide faces of the multiple-collar bearing are thus disposed entirely within the stream of drilling fluid and are lubricated most efficiently, the centrifugal force urging the drilling fluid out of the recesses 19 between the grooves 27 and the rubber guide faces into the recesses 20 to ensure a continuous renewal of the lubricating fluid on the slide faces.

What is claimed is:

1. A bearing assembly for an oil well drilling turbine adapted to be driven by an axially flowing drilling fluid, which bearing assembly comprises a tubular casing adapted to receive said drilling fluid at the upper end thereof, a turbine shaft rotatably arranged in said casing, and a multiple-collar bearing comprising a plurality of collars keyed and axially fixed to said shaft and a plurality of annular supporting discs disposed in and axially and non-rotatably fixed to said casing, each of said collars extending between two adjacent ones of said discs and being axially supported thereby, adjacent collars and discs being in slidable engagement with each other on unapertured, radially extending engaging surfaces between the inside periphery of said discs and the outside periphery of said collars, each of said collars being formed with a plurality of openings which are disposed radially inwardly of the inside periphery of the two discs adjacent thereto, which openings are axially aligned to provide continuous fluid passages disposed inwardly of said engaging surfaces, each of said discs being formed with a plurality of openings which are disposed radially outwardly of the outside periphery of the two collars adjacent thereto, said openings in said discs being axially aligned to provide continuous passages disposed outwardly of said engaging surfaces and extending throughout the axial extent of said multiple-collar bearing, said openings in said collars and discs extending radially outwardly and inwardly, respectively, as far as to said engaging surfaces, said passages inwardly and outwardly of said engaging surfaces being in communication with said upper end of said casing.

2. A bearing assembly as set forth in claim 1, in which said openings in said collars consist of groove-shaped recesses formed in the inside periphery of said collars and open to said shaft and said opening in said discs consist of groove-shaped recesses formed in the outside periphery of said discs and open to said casing.

3. A bearing assembly as set forth in claim 1, in which said discs are superimposed on each other and which comprises a section rail extending through a row of vertically aligned openings in said discs to provide for an axial alignment of the openings therein.

References Cited in the file of this patent

UNITED STATES PATENTS

| | | |
|---|---|---|
| 1,386,491 | Brown | Aug. 2, 1921 |
| 1,965,564 | Bannister | July 10, 1934 |
| 2,588,311 | Wagner | Mar. 4, 1952 |
| 2,592,519 | Postlewaite | Apr. 8, 1952 |

OTHER REFERENCES

Turbine Drilling in the USSR (paper given in Rome, June 1955).